United States Patent
Bothe et al.

(10) Patent No.: US 7,492,923 B2
(45) Date of Patent: Feb. 17, 2009

(54) METHOD AND DEVICE FOR DETECTING THE OCCUPANCY STATE OF A SEAT

(75) Inventors: Hans-Dieter Bothe, Seelze (DE); Hoang Trinh, Hildesheim (DE); Heiko Freienstein, Hildesheim (DE); Thomas Engelberg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 387 days.

(21) Appl. No.: 10/524,703

(22) PCT Filed: Feb. 24, 2003

(86) PCT No.: PCT/DE03/00566

§ 371 (c)(1),
(2), (4) Date: Oct. 31, 2005

(87) PCT Pub. No.: WO2004/020242

PCT Pub. Date: Mar. 11, 2004

(65) Prior Publication Data

US 2006/0161321 A1    Jul. 20, 2006

(30) Foreign Application Priority Data

Aug. 21, 2002  (DE)  ............................. 102 38 222

(51) Int. Cl.
*G06K 9/00* (2006.01)
(52) U.S. Cl. ............... 382/104; 382/190; 382/106; 382/320; 382/175; 382/199; 382/103; 382/100; 340/573.1; 340/436; 340/545.4; 348/77; 280/733; 280/735; 701/45
(58) Field of Classification Search ............ 701/45, 701/140, 195, 203, 205; 382/190, 100, 103, 382/320, 106, 175, 199; 340/573.1; 348/77; 250/221; 280/733, 735
See application file for complete search history.

(56) References Cited

U.S. PATENT DOCUMENTS

| | | | | |
|---|---|---|---|---|
| 5,570,903 A | * | 11/1996 | Meister et al. | 280/735 |
| 5,678,854 A | * | 10/1997 | Meister et al. | 280/735 |
| 5,983,147 A | * | 11/1999 | Krumm | 701/45 |
| 6,116,640 A | * | 9/2000 | Tanaka et al. | 280/735 |
| 6,480,616 B1 | * | 11/2002 | Hata et al. | 382/106 |
| 6,553,296 B2 | * | 4/2003 | Breed et al. | 701/45 |

(Continued)

FOREIGN PATENT DOCUMENTS

WO    WO 01 19648    3/2001

(Continued)

*Primary Examiner*—Jingge Wu
*Assistant Examiner*—Nancy Bitar
(74) *Attorney, Agent, or Firm*—Kenyon & Kenyon LLP

(57) ABSTRACT

A method and a device for detecting the occupancy state of a seat, e.g., in a vehicle, and for use in activating a restraint mechanism allocated to the seat, as a function of the occupancy state, are provided. With the aid of an image recording system, a 3D image of the seat is recorded and evaluated with respect to the occupancy state, and optionally also with respect to the type of the occupancy. For the evaluation, a 3D pattern is drawn upon, which is available externally or which is able to be generated internally in an initialization step. A hierarchically constructed evaluation also permits, after determination of an occupancy state, a classification with respect to the type of the respective occupancy.

15 Claims, 5 Drawing Sheets

U.S. PATENT DOCUMENTS

| | | | |
|---|---|---|---|
| 6,703,845 B2 * | 3/2004 | Stanley et al. | 324/663 |
| 7,164,117 B2 * | 1/2007 | Breed et al. | 250/221 |
| 7,173,190 B2 * | 2/2007 | Bothe et al. | 174/113 R |
| 7,245,741 B1 * | 7/2007 | Ertl et al. | 382/103 |
| 7,349,587 B2 * | 3/2008 | Cohen et al. | 382/320 |
| 7,386,372 B2 * | 6/2008 | Breed et al. | 701/1 |
| 2002/0149184 A1 * | 10/2002 | Ertl et al. | 280/733 |

FOREIGN PATENT DOCUMENTS

| | | |
|---|---|---|
| WO | WO 02 40320 | 5/2002 |
| WO | WO 02 49882 | 6/2002 |

* cited by examiner

METHOD AND DEVICE FOR DETECTING THE OCCUPANCY STATE OF A SEAT

FIELD OF THE INVENTION

The present invention relates to a method and device for detecting the occupancy state of a seat, e.g., in a vehicle, and for use in activating means of restraint allocated to the seat, as a function of the occupancy state, in which, with the aid of an image recording system, a 3D image of the seat is recorded and evaluated with respect to the occupancy state, and possibly also with respect to the type of the occupancy.

BACKGROUND INFORMATION

Means of restraint that are able to be activated irreversibly, e.g., pyrotechnically ignitable ones, such as air bags or belt pretensioners, have become standard for cars. When a situation is detected that is dangerous for a person sitting in the seat, e.g., an impact onto an obstacle, these means of restraint are triggered in order to protect the person from dangerous injury. For reasons of cost, the triggering should not occur if the seat is not occupied. Furthermore, triggering should not occur if there is not a person in the seat, but rather an object. Triggering is particularly to be avoided if the object is a baby carrier. In addition, it would be desirable to be able to have triggering procedures that are adaptable as a function of the stature of the person. Therefore, in order to avoid very unsafe, only manually operable switches, a method and a device are required which, with the greatest possible safety, are able to detect, for one, the occupancy state as such. In addition, these methods and devices, under certain circumstances also together with others, should permit distinguishing at least between objects and persons, and, if possible, also between different objects, and particularly between different persons or rather, types of persons.

For example, U.S. Pat. No. 5,570,903 describes assigning a mat to the seat surface of a seat, with the aid of which the weight of an object acting on the seat is ascertainable. By using a matrix-like system of sensors, a pressure distribution may also be ascertained, and optionally also the distance apart of the ischial tuberosities of a person. To be sure, the occupancy state is easy to ascertain, but this procedure is extraordinarily cumbersome, and also costly, since special seats are required.

U.S. Pat. No. 5,983,147 describes producing an image at least for the front passenger seat, using a stereo-video camera. The respective image may thereupon be evaluated as to whether the seat is occupied at all, and whether, if so, a person or an object is there. For the initialization of this procedure, a very cumbersome and drawn-out learning or training phase is required, since for each type of state to be detected, especially when objects and persons are to be distinguished, empirically determined training data have to be placed at disposal, and these training have first of all to be determined and entered. For the application of this, on the basis of the training data and data obtained by the image as well as appropriate algorithms, a classification is made, first according to occupancy state and then according to occupancy type. This procedure has grave disadvantages. For instance, types of occupancy that were not foreseen in the training data are not able to be recorded, which may lead under certain circumstances to serious misinterpretations, that is, erroneous classifications. Moreover, changing illumination situations, of the kind frequently appearing in daily traffic, may likewise lead to erroneous classifications. Also, in the training phase, non-trained seat parameters may lead to erroneous classifications. Finally, when a seat is exchanged, a renewed initialization has to be carried out, the corresponding training data not being available for all seats sold in the trade. Consequently, this conventional procedure based on the ascertainment of a 3D image is not only extremely costly, but is also unrelieble in the wider scope.

Accordingly, an object of the present invention is to provide an improved method and device for detecting the occupancy state and optionally also the occupancy type.

SUMMARY

In accordance with the present invention, as a reference for an unoccupied seat, a 3D pattern of the seat is set up. It should be noted that for most seats, such 3D patterns may already be available in the factory or on delivery, for example, if the seat was developed with the aid of CAD technology, for instance, in the form of a so-called wire screen model. The 3D image ascertained in operation by the image recording system may now be analyzed, with respect to the 3D pattern, for at least serious and/or specific deviations. An effortful training phase is not required for the analysis. In further development, partial regions of the seat, such as the seat surface, the backrest, the headrest and also sections thereof, such as the upper section of the backrest and the lower section of the backrest, may be analyzed with respect to the agreement of the 3D image with the 3D pattern, so that, in the case of detecting an occupancy of the seat, certain classifications with respect to the type of the objects causing the occupancy may be carried out.

DETAILED DESCRIPTION

Figure 1:
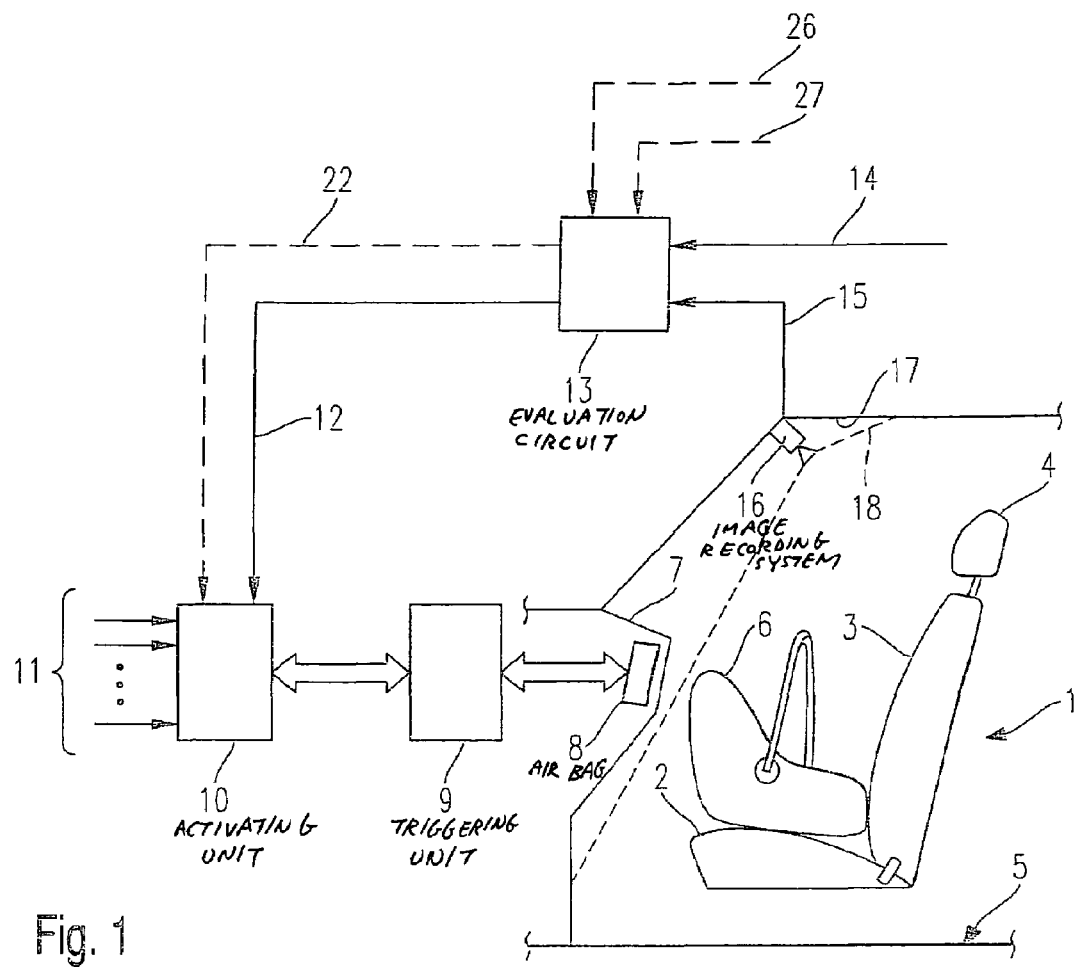
FIG. 1 schematically illustrates a device for carrying out the method according to the present invention.

FIG. 1 schematically shows a seat 1 having seat surface 2, backrest 3 and headrest 4 in a vehicle 5, e.g., a front passenger seat. In the front passenger seat 1, there is, for instance, a baby carrier 6 as the object occupying front passenger seat 1. In the area of dashboard 7 in vehicle 5, opposite front passenger seat 1 there is a pyrotechnically ignitable air bag 8 as example of a restraining means. A triggering unit 9 is allocated to air bag 8, which is able to be activated by an activating unit 10 for triggering or not triggering, as necessary according to a predefined type of triggering decision. For this purpose, activating unit 10 receives a series of input signals 11, of which at least one is a signal that reflects whether vehicle 5 is exposed to an acceleration corresponding to a dangerous impact upon an obstacle. In particular, activating unit 10 additionally receives an input signal 12 that describes the occupancy state of front passenger seat 1.

This occupancy state input signal 12 is generated by an evaluation circuit 13, activating unit 10 being able to activate triggering unit 9 only if occupancy state input signal 12 is present. That is to say, if front seat 1 is not occupied, triggering of air bag 8 is prevented.

Evaluation circuit 13 makes the analysis, based, on the one hand, on a 3D pattern of front passenger seat 1, appropriate 3D pattern data 14 being stored in either an internal or an external memory (not shown in detail), and based, on the other hand, on 3D image data 15 which are ascertained by an image recording system 16. In the exemplary embodiment, image recording system 16 is mounted in the vehicle's headliner 17, and is in a position to record front passenger seat 1 in its entirety, which is symbolized by a recording cone 18 shown by broken lines.

Figure 2:
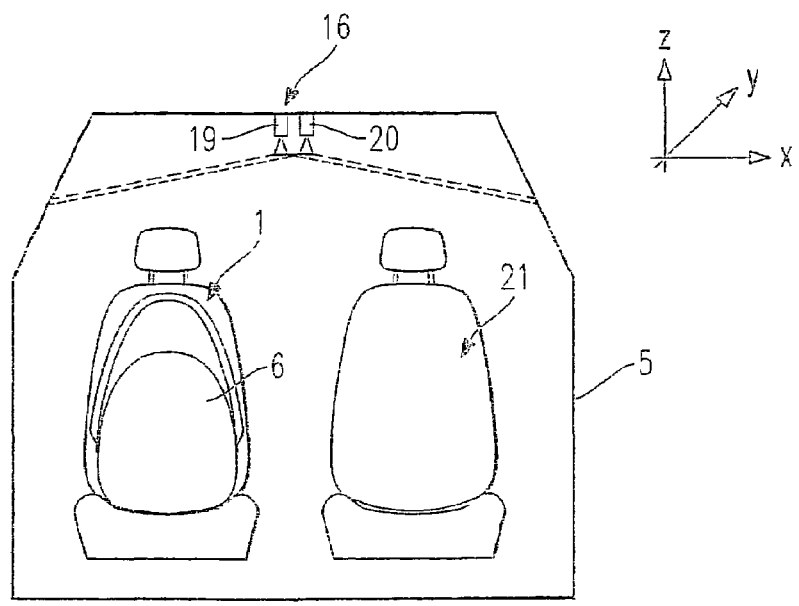
FIG. 2 shows a front view of seats in a vehicle.

The image recording system 16 may have two video cameras 19 and 20, as shown in FIG. 2, in order to be able, in a convenient manner, to record a 3D image and generate from it corresponding data 15. FIG. 2 also shows that, using image recording system 16, not only front passenger seat 1 but also driver's seat 21 may be recorded. However, the desired avoidance, in order to avoid unnecessary repair costs, of the irreversibly activatable triggering of the means of restraint allocated to driver's seat 21 in the case of non-occupancy of driver's seat 21, is of rather limited importance, since, for a traveling vehicle, one may basically assume an occupancy state (to be sure, even by one person). However, a classification of the occupancy type may be meaningful for triggering.

However, all the data describing the real situation of a seat are usable with 3D image data 15 in the present invention. They may be ascertained by distance measuring sensors, based on which an image in a spatial coordinate system may be constructed. The following, for example, are suitable: Stereo camera systems, multi-camera systems (made up of at least two cameras), so-called range image systems that analyze according to an operating time principle, laser scanners, radar systems, sensors that work with structured illumination, etc.

FIG. 1 also shows that evaluation circuit 13 is able to supply additional signals, namely occupancy type input signals 22, for activating unit 10 if evaluation circuit 13 is designed in an appropriate manner, as will be described below in greater detail.

Even though the present invention is being explained in light of the activation of an air bag 8 allocated to front passenger seat 1 as a means of restraint that is irreversibly activatable, the present invention may be used for all means of restraint allocated to a seat, for whose activation the occupancy state of the seat and optionally also the type of occupancy of the seat are being utilized, such as pyrotechnically ignitable belt tensioners, seat belt tensioners activated by an electric motor, side air bag, knee air bag, head air bag, and adjusting mechanisms for bringing the parts of the seat (seat surface, backrest, headrest) into a favorable situation for the impact that is to be expected. To the extent that the occupancy type is detected, which will be explained in more detail below, the present invention is also usable for activating the means of restraint for the driver's seat 21.

As is explained in greater detail below, using the present invention, not only is one able to generate in a favorable manner not only the occupancy state input signal 12 that indicates the occupancy state for activating unit 10, but also at least one input signal 22 that specifies and discriminates with respect to the type of occupancy. This means that, with the aid of occupancy state input signal 12, it is only recorded whether seat 1 is occupied, which may include an object such as baby carrier 6. Since, however, air bag 8 is not to be triggered in response to objects such as baby carriers 6, expediently upon detection of an occupied seat 1 one needs to undertake additional discriminations to determine whether seat 1 is occupied by a person or an object.

This discrimination may take place using the usual signals within the scope of input signals 11. As is explained in greater detail below, this discrimination is also able to take place with the aid of the present invention, and with the aid of generating the at least one occupancy type input signal 22. A one-time state may be erroneous, so that it is useful to verify a once-ascertained evaluation result at a temporal distance, especially since a change of the occupancy state and a change of the occupancy type during travel are made only rarely, and possibly at considerable time spans, whereas the ascertainment of the 3D image data ("scanning"), by contrast, is repeated at substantially smaller time periods. Evaluation circuit 13 expediently carries out a temporal filtering of evaluation results obtained one after another by, for example, forming a moving average value or a median value or the like. Thereby, signals 12 and 22 may be designed to be very robust, i.e., very secure in their interpretational content.

Figure 3:
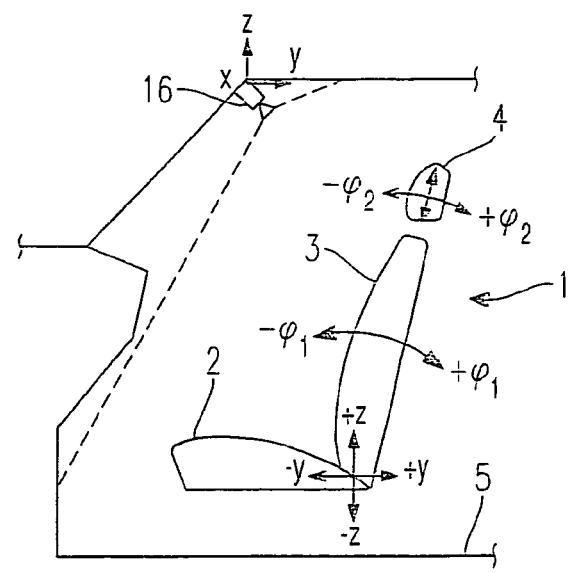
FIG. 3 schematically illustrates the various possibilities of motion of the parts of the seat with respect to one another.

In a similar representation as in FIG. 1, FIG. 3 shows to what extent the various partial regions of seat 1, seat surface 2, backrest 3, and headrest 4 may be adjustable to one another or against one another, as well as being adjustable with respect to vehicle 5. With the aid of image recording system 16, the 3D image will correspond to the actual position of the various partial regions 2, 3, and 4 of seat 1, and, for example, in coordinate directions x, y and z. In any case, upon suitable preparation of data 14 of the 3D pattern that corresponds to the mutual allocation of these partial regions, on the one hand, one may carry out an analysis of 3D image data 15 for discriminating with respect to the deviation of the actual position of the various partial regions from a desired position. On the other hand, what is avoided is an erroneous interpretation regarding an occupancy state or a non-occupancy state. Finally, for each of the partial regions, by separate evaluation and drawing upon the appropriate data of the pattern for the various partial regions, seat surface 2, backrest 3 and headrest 4, one may separately determine a respective occupancy state, from which, for the purpose of classification, one may draw a conclusion on the certain type of the occupancy. If, for example, seat surface 2 and backrest 3 are detected as being occupied, but headrest 3 is detected as being not occupied, this may be interpreted as occupancy of seat 1 by an object or a small person. In a hierarchical further development, in the various partial regions one may, in turn, define further subregions which are subjected to an evaluation, and, for example, the presence of an occupancy state in the lower section of backrest 3, and the non-presence of an occupancy state in the upper section of backrest 3, may be interpreted as the presence of an object, such as a baby carrier 6, for examaple, and this may be drawn upon to avoid triggering of the irreversible means of restraint, in spite of the ascertained occupancy state of seat 1.

Figure 4:
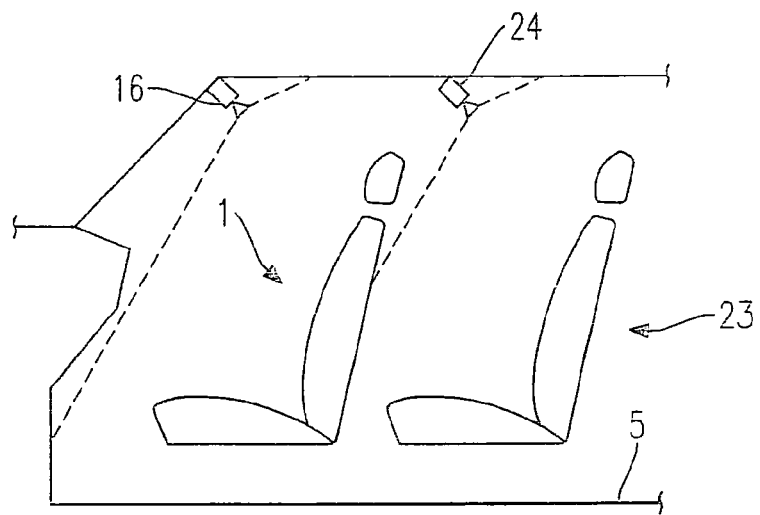
FIG. 4 illustrates a system in which separate image recording systems are provided for front seats and rear seats.
Figure 5:
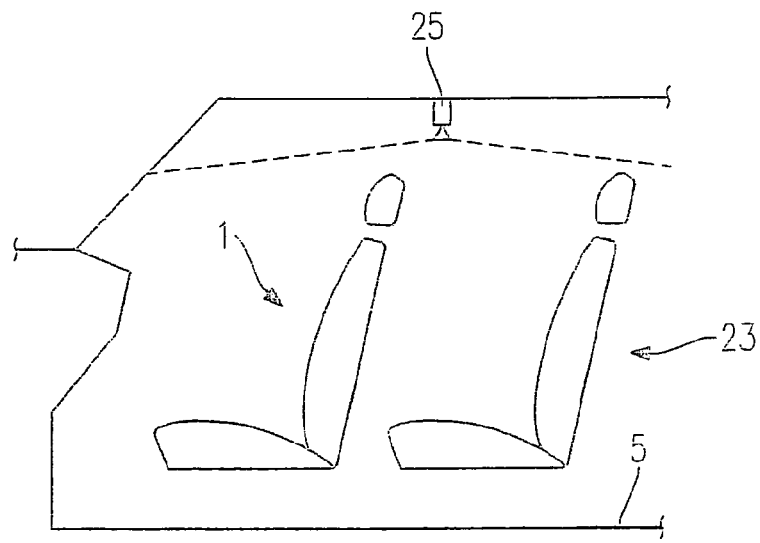
FIG. 5 illustrates the possibility of installing a single image recording system for both front and rear seats.

FIG. 4 shows schematically the application of the present invention for back seats 23. For this purpose, in the example embodiment according to FIG. 4, a separate image recording system 24 is provided for back seats 23. Alternatively, as shown in FIG. 5, a common image recording system 25 may be provided for both front passenger seat 1 in the front region of vehicle 5 and for back seats 23. Without requiring a more detailed explanation, it should be noted that the present invention may also be used in vehicles 5 that have more than two rows of seats, and/or in which more than two seats are situated next to one another. This means that the present invention may be used in every case in which, as a function of the occupancy state of a seat, and optionally as a function of the type of occupancy of the seat, devices allocated to the seat are to be triggered, such that these devices may be triggered in a certain way and/or may be prevented from being triggered.

Image recording systems 16, 24 and/or 26 may also be provided at other locations in vehicle 5, for instance, at the vehicle console, the A-pillar, B-pillar and/or the C-pillar, etc. What is essential is that the recording of 3D image data 15 of an observed seat 1, 21, or 23 is as unobstructed as possible.

Figure 6:
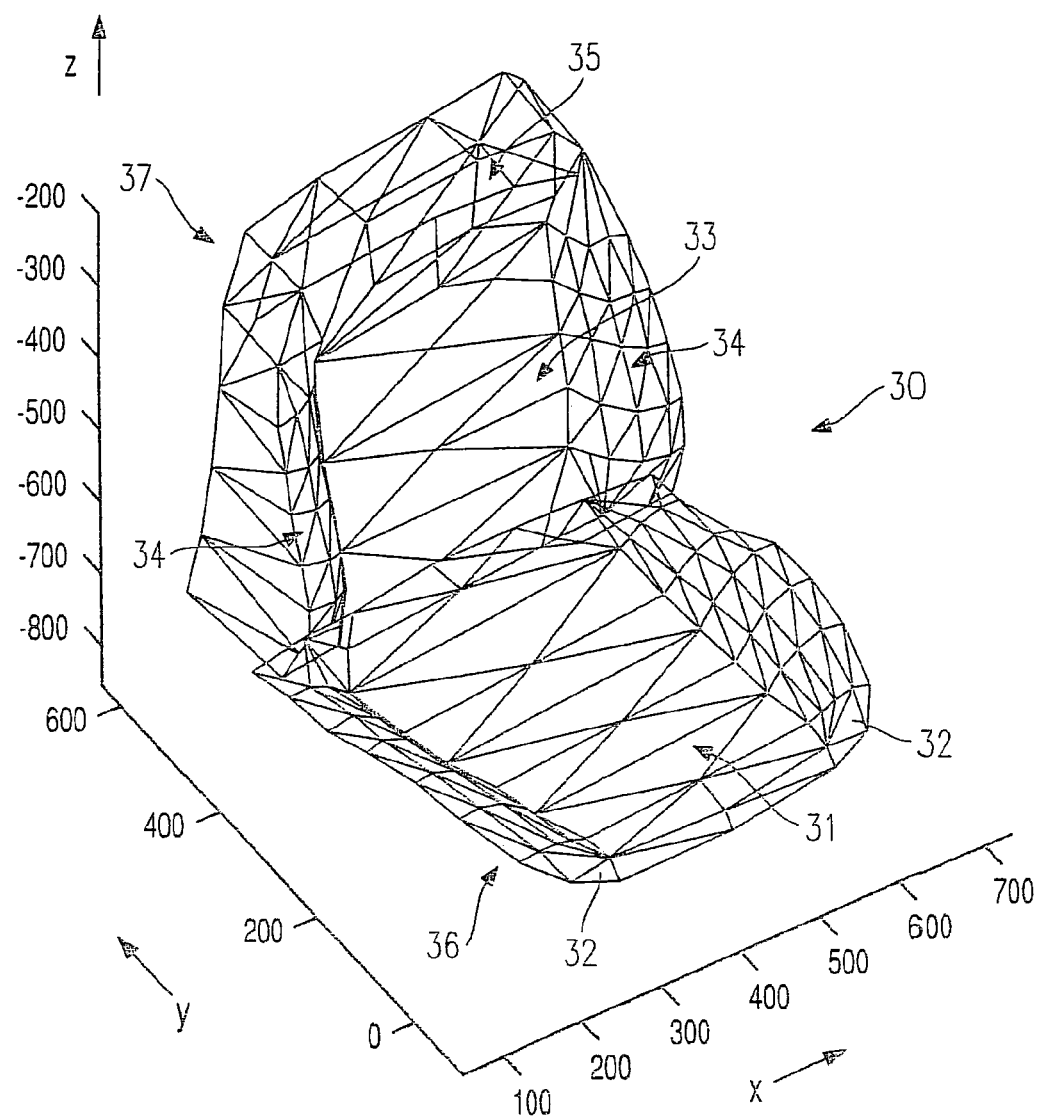
FIG. 6 schematically illustrates the basic appearance of a wire screen model of a seat.

An example of how the data with respect to the pattern of a seat are able to be developed is seen in FIG. 6. FIG. 6 shows schematically in a 3-dimensional coordinate system a so-called wire screen model 30 for a seat having a seat surface 36 and a backrest 37. Beadings 32 that edge seat wells 31, and beadings 34 that edge back well 33 at the side, as well as the less prominently shaped upper beading 35 are clearly recognizable. It is also clearly recognizable that the region of seat surface 36 and the region of backrest 37 of this wire screen model 30 of a seat are easily separable from one another and thereby may be discriminated from one another. Such a wire screen model 30 of a seat may be generated by the manufacturer in the manufacturing processes or during development using CAD, which means the corresponding data may be supplied along with the delivery of the seat, so that 3D pattern data 14 (FIG. 1) do not have to be generated separately. This applies also to retrofitted special models of seats, to the extent that these are in a certain series by the respective manufacturer.

It has been shown that, using little effort, subregions of the seat, such as the lower section of the backrest and the upper section of the backrest, may be separated from each other, and thereby drawn upon for an evaluation according to the present invention.

If, as in the exemplary embodiment, the 3D image of a seat is recorded with the aid of a video image recording system, the corresponding 3D image data 15 are available in a different format than the 3D pattern data 14, if these, for instance, were generated starting from a wire screen model 30. It is then necessary to carry out a format transformation in such a way that evaluation circuit 13 is able to draw upon data having a uniform data format for the evaluation.

Within the scope of the present invention, it is also possible to generate 3D pattern data 14 in an initializing step. This is done in that seat 1 is recorded, using image recording system 16 of vehicle 5, if seat 1 is guaranteed to be unoccupied, and the data ascertained here are optionally submitted to an abstraction, and these are then filed as the 3D pattern data 14 in a memory for evaluation by the circuit 13. Expediently, such a recording or scanning takes place under specified surrounding conditions, that is, before delivery of vehicle 5. In the case of new installation of a seat, this initialization would, if necessary, have to be carried out over again.

Figure 7:
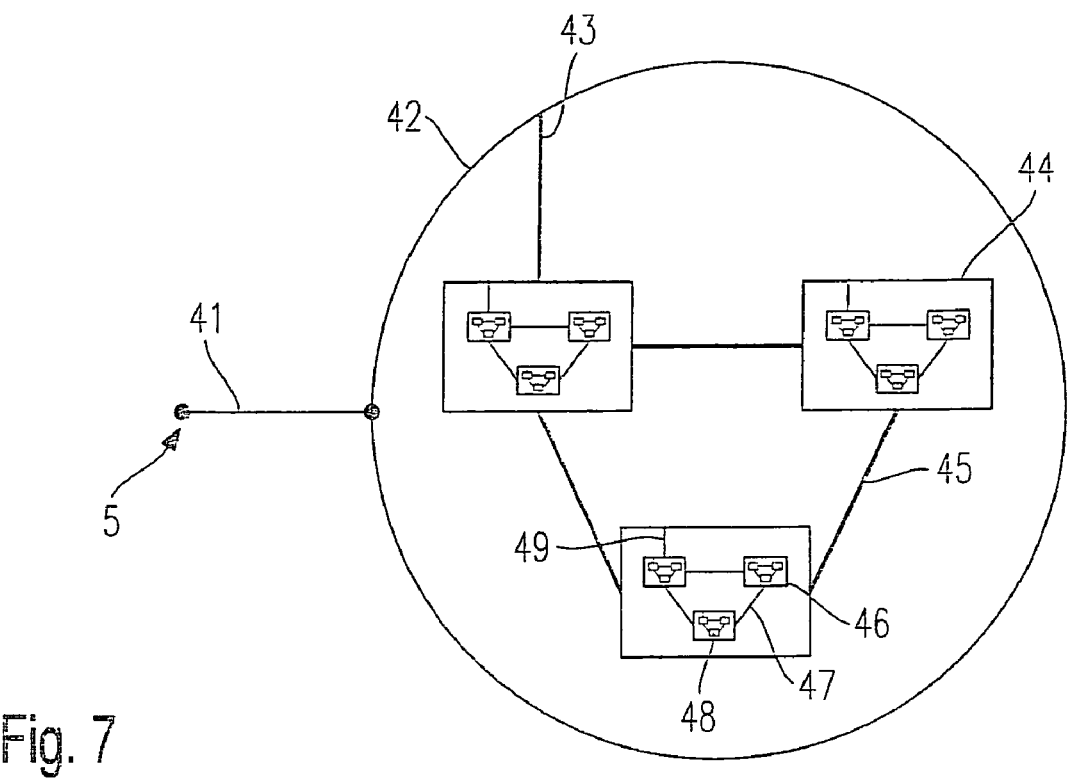
FIG. 7 schematically illustrates the basic construction of the hierarchical evaluation possibility in accordance with the present invention.

In connection with FIG. 7, the model-based method according to the present invention is explained.

A pattern of zero order 42 corresponding to a pattern of a seat 1, which is represented by a large circle, has a predefined positional relationship 41 to vehicle 5 in which seat 1 is installed. Pattern of zero order 42 includes several patterns of first order 44, which as a totality have a certain positional relationship 43 with respect to pattern of the zero order 42. Patterns of first order 44 have among themselves, in turn, a predefined positional relationship 45. Patterns of first order 44 again include several patterns of second order 46 which, in their totality, have a predefined positional relationship 49 with respect to pattern of first order 44, and which patterns 46, in turn, have a predefined positional relationship 47 with respect to one another. Second-order pattern 46, in turn, may have imbedded therein third-order patterns 48, etc, as indicated. Thus, a strongly hierarchical classification is possible in this area.

Figure 8:
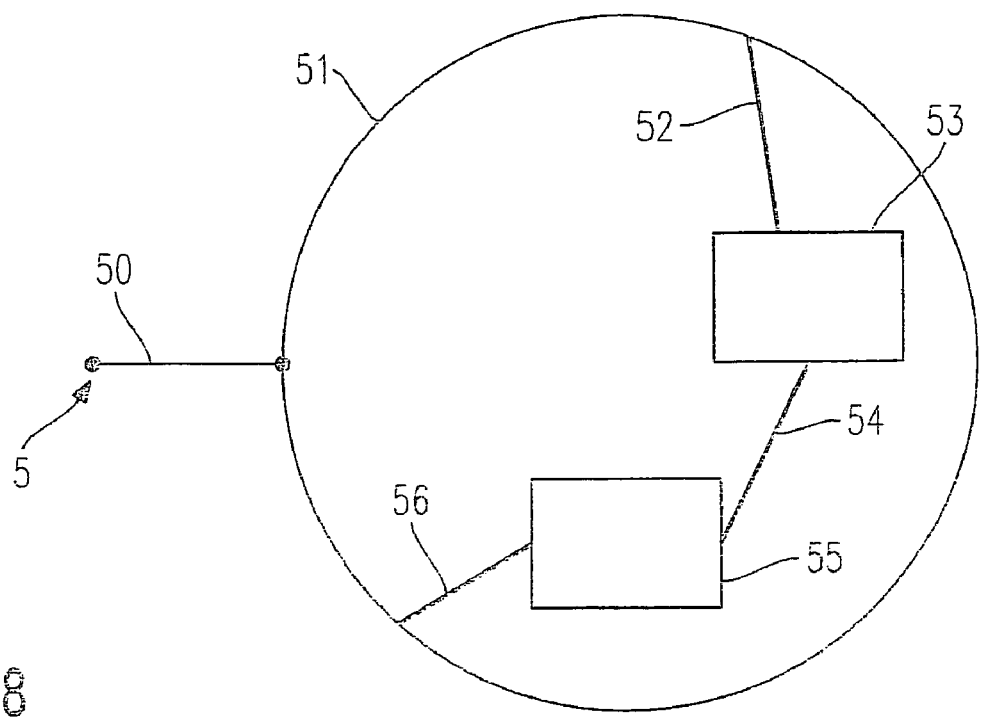
FIG. 8 schematically illustrates a simple model of the hierarchical construction usable for seats.

For a seat 1 not having a headrest 4, an explanation of the present invention is provided in connection with FIG. 8. Pattern 51 of seat 1, again represented by a circle, has a predefined positional relationship 50 to vehicle 5. The pattern 53 of the backrest as a first-order pattern and pattern 55 of the seat surface, also as a first-order pattern, on the one hand have a predefined positional relationship 54 to each other. Furthermore, pattern 53 of the backrest has a certain positional relationship 52 to pattern 51, and pattern 55 of the seat surface also has a certain positional relationship 56 to pattern 51 of the overall seat.

This hierarchical structure makes it permissible, when applying the method according to the present invention, to end the evaluation process as a function of the result of the evaluation with respect to a pattern of a lower order, e.g., when it has been determined that the seat is not occupied, or to cause additional evaluations with respect to patterns of a higher order to be carried out, and if necessary, for seats determined as being occupied, ascertain whether the seat is occupied by an object or a person, etc.

Figure 9:
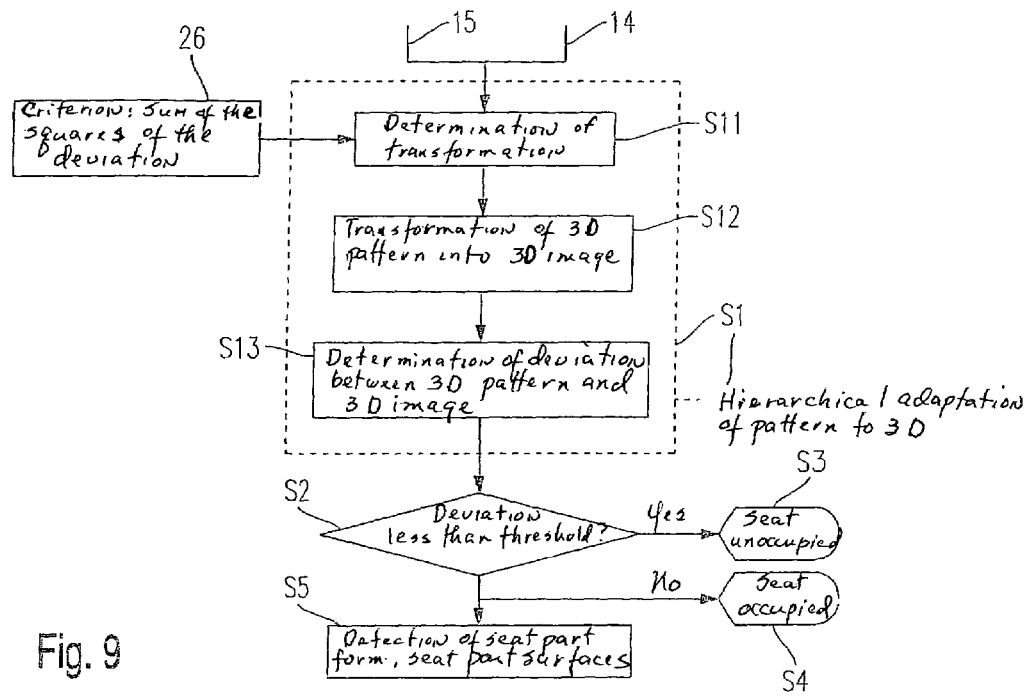
FIG. 9 is a flow chart of a method for detecting the occupancy state of a seat.

The procedure according to the present invention is next explained in the light of the flow chart shown in FIG. 9. As was mentioned before, evaluation circuit 13, on the one hand, receives 3D pattern data 14 from a memory, for instance, data corresponding to wire screen model 30, as well as 3D image data 15, for example, data ascertained from an image recording system 16, or even 3D image data ascertained by any other vehicle-resident measuring system reproducing the actual state. As was mentioned, these data 14 and 15 are generally not present in the same data format. In a step S1 there first takes place a hierarchical adaptation of 3D pattern data 14 and 3D image data 15. In order to determine the extent of the necessary adaptation, it is first required that one specify a criterion 26 based on which the evaluation is to take place, e.g., the evaluation may be made based on the sum of the squares of the deviations. This criterion 26, in one step S11, determines the type and the volume of the necessary transformation and also the abstraction. In a step S12 there then follows the transformation, namely, in the exemplary embodiment, a transformation of the 3D pattern data 14 into the format of the 3D image data 15. Of course, a transformation of the 3D image data 15 into the format of the 3D pattern data 14 may also be carried out, or one may also carry out a transformation both of the 3D pattern data and the 3D image data into a third data format. As a function of criterion 26, the measure of a necessary or meaningful abstraction of the data for the purpose of evaluation may also be determined. Starting from the data now present in the uniform data format, in step S13 there takes place the determination as to whether there are deviations between the 3D pattern data and the 3D image data, and if necessary, to what extent.

In a step S2 there is then made the determination as to whether the determined deviations exceed a fixed threshold 27 or not. If the determined deviations are less than threshold 27, this is interpreted as meaning that corresponding seat 1 is empty, i.e., not occupied (Step S3). If the deviation determined in step S2 exceeds threshold 27, this is interpreted as meaning that the seat is occupied (step 4). Output signal 12 of evaluation circuit 13 reflects the one or the other state.

The threshold 27 is required if for no other reason than that, based on measuring inaccuracies and conversion inaccuracies in the transformation, false determination of deviations may come about, although actually there are none. Threshold 27 may also be set in such a way that placing of small objects onto the seat is not detected as being an occupation of the seat, e.g., laying down magazines or articles of clothing. On the other hand, threshold 27 is set so that when larger objects are laid down, the determination is made that there is an occupancy state. In this context, the value of relevant threshold 27 for front seats and rear seats may be quite different (in case of an accident, a briefcase left on the rear seat may represent a dangerous missile for people on the front seats).

Figure 10:
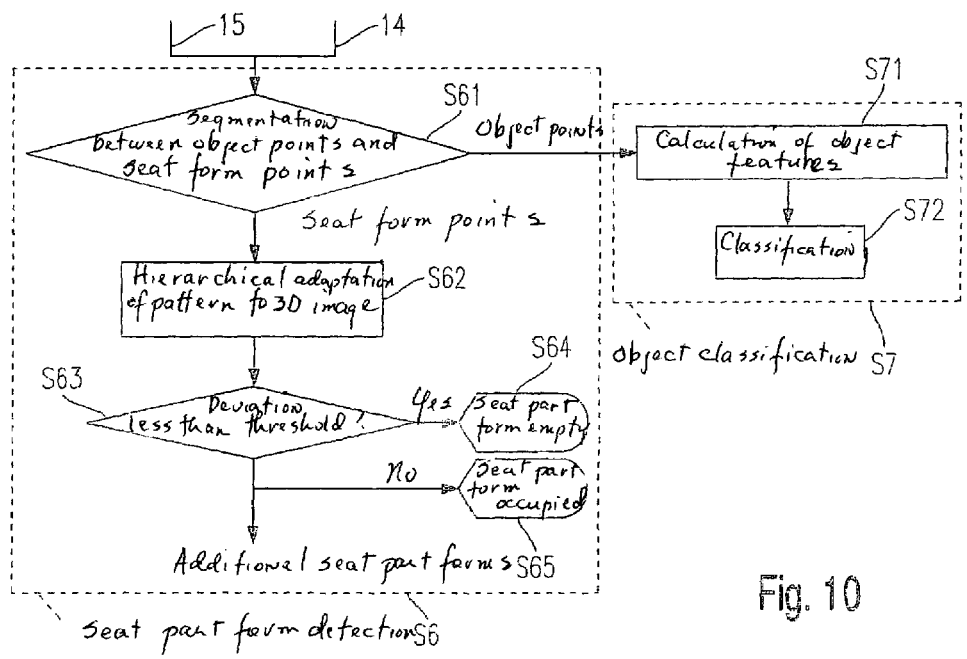
FIG. 10 is a flow chart of method steps in which the occupancy state is ascertained separately for certain partial regions.

Step S5 represents continuing method steps which are provided for generating signals 22 that designate the type of occupancy. This is schematically illustrated in the flow chart shown in FIG. 10.

In the case in which in step S4 the occupancy of the seat has been determined, in step S6 there is first carried out a selection with respect to the partial regions to be examined (seat surface, backrest, or headrest) or even subregions thereof, such as lower section and upper section of the backrest, corresponding to step S61.

If necessary, a renewed transformation or adaptation has to be made in the sense of step S1 and its substeps S11 and S12. Now, in step S63, the deviation determined for the partial region or the subregion is compared to an appropriate threshold, and, in the case at hand, corresponding to step S64 or corresponding to step S65, it is determined whether the partial region of the seat or the subregion of the partial region of the seat may be regarded as being occupied or as not being occupied or empty. This may be done stepwise or in parallel for various partial regions and subregions of partial regions. Taking up the example of baby carrier 6 according to FIG. 1, it is first determined, by using the procedure according to the flow chart shown in FIG. 9, whether seat 1 is occupied at all. If yes, partial regions, i.e., seat surface 2, backrest 3, and/or headrest 4, are first investigated with respect to occupancy, it being determined, for the example of baby carrier 6, that seat surface 2 is to be regarded as being occupied, and that headrest 4 is to be regarded as being empty, it being assumed that backrest 3 is also to be regarded as occupied because of the exceeding of a threshold. In this case it is expedient and meaningful to investigate subregions of backrest 3 as to whether they have to be regarded as occupied or not. In this corresponding evaluation it will be determined that the upper section of backrest 3 should be regarded as unoccupied, while the lower section of the backrest is to be regarded as occupied. In a similar manner one may discriminate, for instance, with respect to whether a child's seat is present.

Such determinations may be drawn upon for the classification of the object in the seat.

The separation or segmentation undertaken in step S61 may also be drawn upon for object-related analysis, i.e., image-related analysis, in a step S7 for calculating object features in a step S71 and corresponding classification in a step S72. Hereby, one is able to calculate the surface occupied by an object and the like, that is, criteria which make classification possible, this classification making possible the suitable generation of activating signals in activating unit 10 for triggering unit 9.

In summary, the present invention permits the recording of the occupancy state in a simple manner, as well as assessing or classifying the type of occupancy of a seat.

What is claimed is:

1. A method for detecting an occupancy state of a seat in a vehicle, comprising:
   recording a 3D image of the seat using an image recording system;
   obtaining a 3D pattern of the seat;
   evaluating the 3D image of the seat with respect to at least one of the occupancy state of the seat and an occupancy type of the seat, wherein the evaluation includes consideration of the 3D pattern of the seat, and wherein if a deviation between the 3D image and the 3D pattern exceeds a predetermined minimum value for the evaluation, a determination of the occupancy state is made indicating that the seat is occupied, and wherein the determination of the occupancy state is regarded as conclusive only if substantially identical evaluation result is obtained over a plurality of sequential time points; and
   activating a restraint mechanism associated with the seat, as a function of at least one of the occupancy state of the seat and the occupancy type of the seat.

2. The method as recited in claim 1, wherein the 3D pattern of the seat is subdivided into partial regions of the seat, and the evaluation of the 3D image includes evaluation of the partial regions of the 3D pattern of the seat.

3. The method as recited in claim 2, wherein the evaluation of the partial regions of the 3D pattern includes evaluation of mutual relationships of the partial regions with one another.

4. The method as recited in claim 1, wherein the 3D pattern of the seat is a wire screen model representing an approximation of the real shape of the seat.

5. The method as recited in claim 1, wherein the 3D pattern of the seat is derived from seat manufacturer's specification of the seat.

6. The method as recited in claim 1, wherein the 3D pattern of the seat is derived in an initialization step from a 3D image of the seat in an unoccupied state under specified surrounding conditions.

7. The method as recited in claim 2, wherein, based on a comparison between a predetermined minimum value and a deviation between at least one selected partial region of the 3D pattern and a corresponding partial region of the 3D image, a type of at least one of an object and a person occupying the seat is determined.

8. The method as recited in claim 7, wherein predetermined parameters of the at least one of the object and the person are further determined.

9. The method as recited in claim 1, wherein, for the determination of the occupancy state, a temporal filtering is performed, including ascertaining one of a moving average and a median value of the deviation.

10. The method as recited in claim 1, wherein, for the evaluation, at least one of measured data corresponding to the 3D image and data corresponding to the 3D pattern are transformed to provide a uniform data format for the 3D image and the 3D pattern.

11. A device for determining an occupancy state of a seat in a vehicle, the occupancy state being considered in the activation of a restraint mechanism associated with the seat, the device comprising:
   an image recording system for recording a 3D image of the seat; and
   an evaluation circuit for evaluating the 3D image of the seat with respect to at least one of the occupancy state of the seat and an occupancy type of the seat, wherein the evaluation includes comparing a 3D pattern of the seat to the recorded 3D image of the seat, and wherein if a deviation between the 3D image and the 3D pattern exceeds a predetermined minimum value for the evaluation, a determination of the occupancy state is made indicating that the seat is occupied, and wherein the evaluation circuit includes a filter circuit for temporal filtering of a plurality of evaluation results sequentially obtained over time, and wherein the determination of the occupancy state is regarded as conclusive only if substantially identical evaluation result is obtained over a plurality of sequential time points.

12. The device as recited in claim 11, wherein the 3D pattern of the seat is subdivided into partial regions of the seat, and the evaluation of the 3D image includes evaluation of the partial regions of the 3D pattern of the seat.

13. The device as recited in claim 11, further comprising a memory associated with the evaluation circuit for storing data for the 3D pattern, wherein the 3D pattern is in the form of a wire screen model.

14. The device as recited in claim 13, wherein the 3D pattern data is obtained from an external source.

15. The device as recited in claim 13, wherein the 3D pattern data are derived in an initialization step from 3D image data of an unoccupied seat under predefined surrounding conditions.

* * * * *